March 1, 1927.

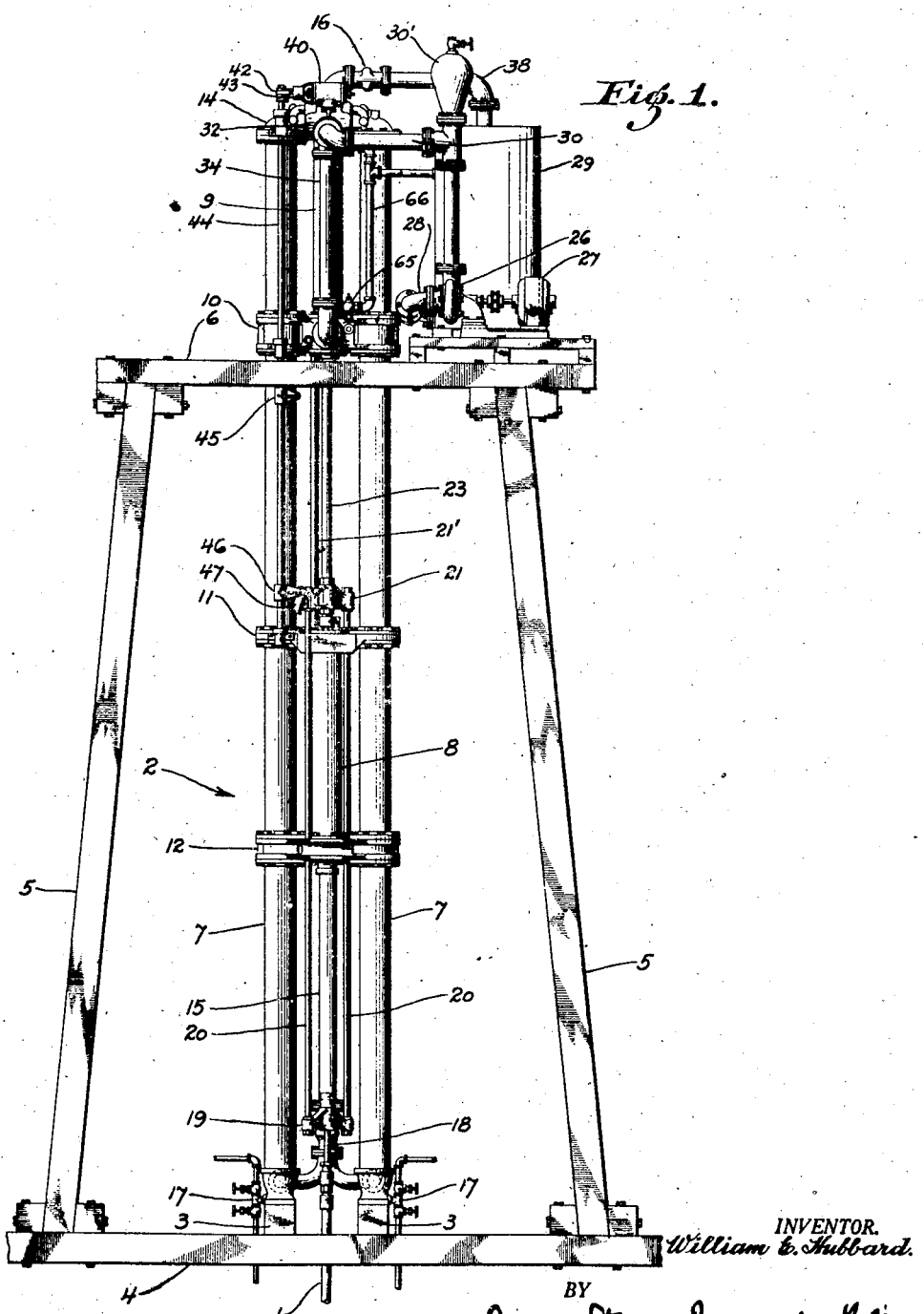

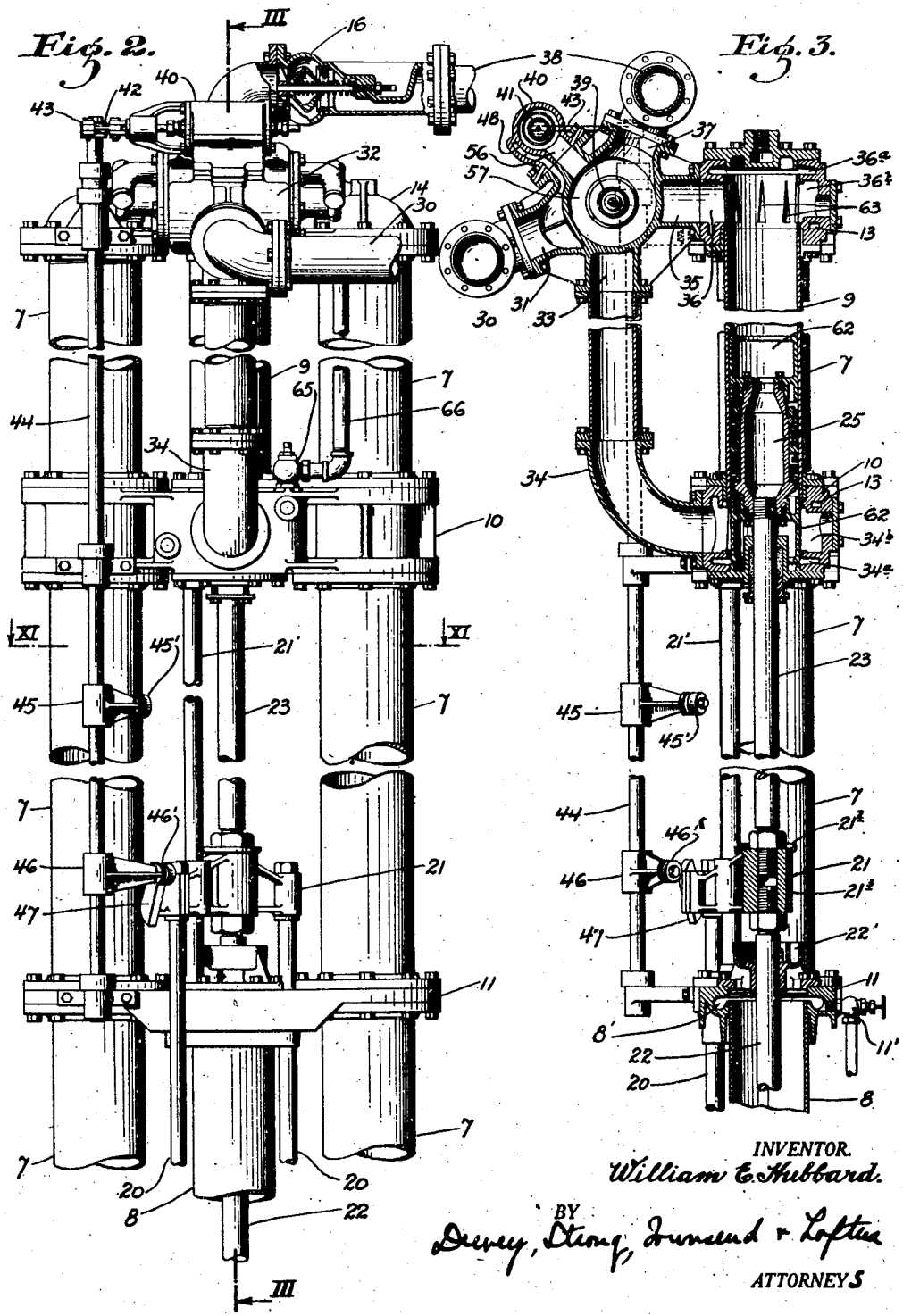

W. E. HUBBARD

PUMPING SYSTEM

Filed July 23, 1925

INVENTOR.
William E. Hubbard.
BY
Dewey, Strong, Townsend & Loftin
ATTORNEYS

March 1, 1927.
W. E. HUBBARD
PUMPING SYSTEM
Filed July 23, 1925     5 Sheets-Sheet 4
1,619,475
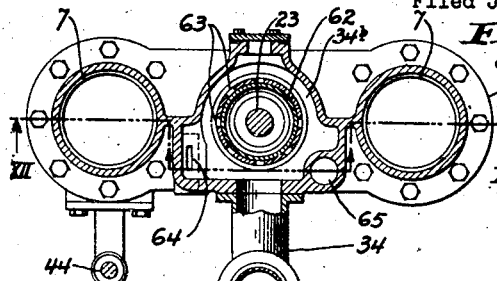
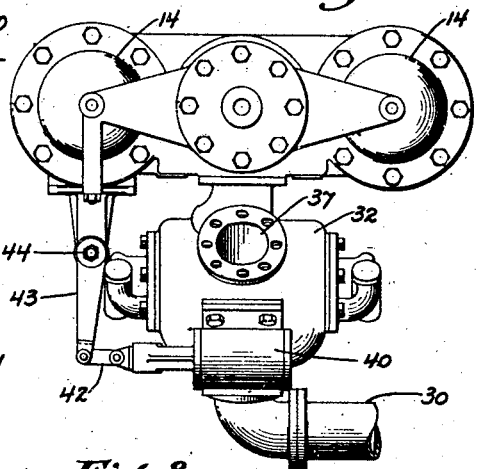
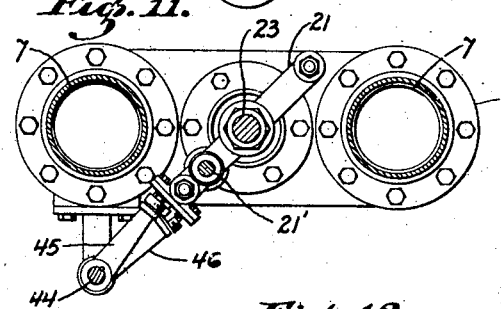
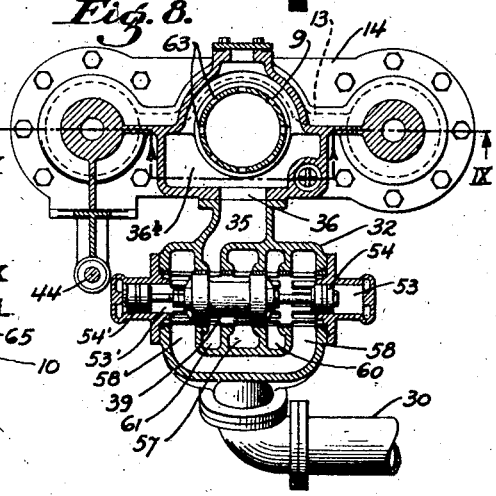
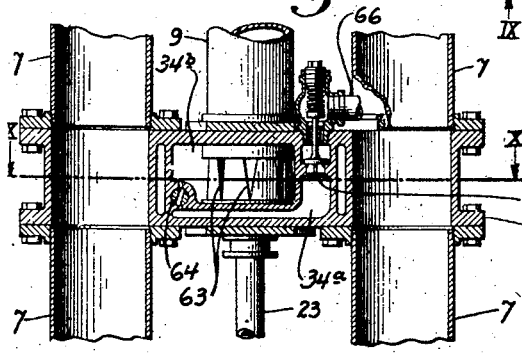
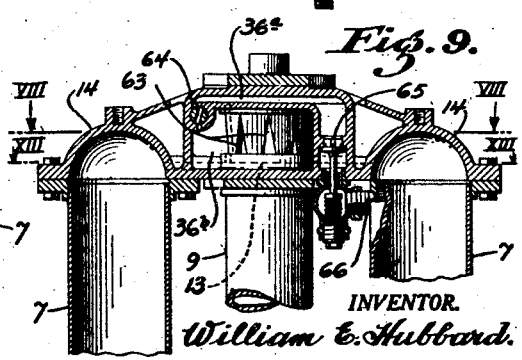
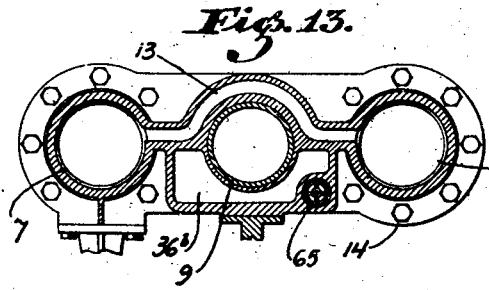
INVENTOR.
William E. Hubbard.
BY
Dewey, Strong, Townsend & Loftus
ATTORNEYS.

March 1, 1927.                    W. E. HUBBARD                    1,619,475
                                  PUMPING SYSTEM
                              Filed July 23, 1925                5 Sheets-Sheet 5

INVENTOR.
William E. Hubbard.
BY
Dewey, Strong, Townsend & Loftus
ATTORNEYS.

Patented Mar. 1, 1927.

1,619,475

UNITED STATES PATENT OFFICE.

WILLIAM E. HUBBARD, OF SAN FRANCISCO, CALIFORNIA, ASSIGNOR TO HUBBARD MACHINE COMPANY, A COPARTNERSHIP CONSISTING OF WILLIAM E. HUBBARD AND LEON SLOSS, JR., BOTH OF SAN FRANCISCO, CALIFORNIA.

PUMPING SYSTEM.

Application filed July 23, 1925. Serial No. 45,454.

This invention relates to pumping systems and particularly to an improved fluid operated pumping system. In pumping systems of the reciprocating type now in use on oil or other deep wells considerable power is necessary, particularly since such power is exerted intermittently, being used only on the up-stroke of the pump. The weight of the pump and sucker rods usually is considerable and this weight operates the mechanism by gravity on the downward stroke. These intermittently operating systems are obviously very inefficient. My invention herein contemplates the use of a continuously operating fluid pressure pump which functions continuously and with constant force to reciprocate the pump rods in the pumping operation.

My invention herein is similar to but involves improved features over the disclosure in my co-pending application Serial No. 27,728, filed May 4, 1925. Obviously these improved systems require a smaller pumping unit, since the same operates continuously, and the operation of such a system is smoother and more uniform than the intermittently operating systems and has other material advantages as will hereinafter appear.

My said co-pending application comprises a pumping system wherein about nine-tenths of the weight of the sucker rods and cooperating mechanism is counterbalanced, whereby the surplus energy of the downward stroke thereof is stored up in the form of a compressed fluid and which fluid reacts on the rods on the upward stroke to assist in raising the same, the one-tenth weight not counterbalanced being just sufficient to draw the rods down by gravity. Combined with the system is fluid-pressure operated means for raising the one-tenth weight of the sucker rods not counterbalanced and the weight of the oil on the up-stroke, the said fluid pressure being provided by a continuously operating pump.

In my present invention, I not only counterbalance all the weight of sucker rods and cooperating mechanism, but I furthermore counterbalance one-half the weight of the oil load to be raised. I combine with this counterbalancing mechanism a double-acting power means, preferably fluid operated from a continuously operating pump, which operates on the over-counterbalanced rods on the downward stroke with a force substantially equal to the operation thereon on the up-stroke. Obviously such a system is most efficient for various reasons, such as smoothness of operation resulting from equal force being exerted in both directions, the permitting of a long efficient stroke, etc.

In the accompanying drawing I have shown one specific embodiment of my invention, but it will be understood that the invention can be otherwise embodied and that the drawings are not to be construed as defining or limiting the scope of the invention, the claims appended to this specification being relied upon for that purpose.

Referring to the figures of the drawings—

Fig. 1 is a front elevation of an entire apparatus embodying my invention.

Fig. 2 is an enlarged broken view of the upper half of Fig. 1.

Fig. 3 is a side elevation thereof mostly in section on line III—III, Fig. 2.

Fig. 7 is a top plan view of the apparatus.

Fig. 8 is a plan section taken on line VIII—VIII, Fig. 9.

Fig. 9 is a fragmentary vertical section taken on line IX—IX of Fig. 5.

Fig. 10 is a plan section taken on line X—X of Fig. 12.

Fig. 11 is a plan section taken on line XI—XI of Fig. 2.

Fig. 12 is a fragmentary vertical section taken on line XII—XII, Fig. 10.

Fig. 13 is a plan section taken on line XIII—XIII of Fig. 9.

Figure 4:
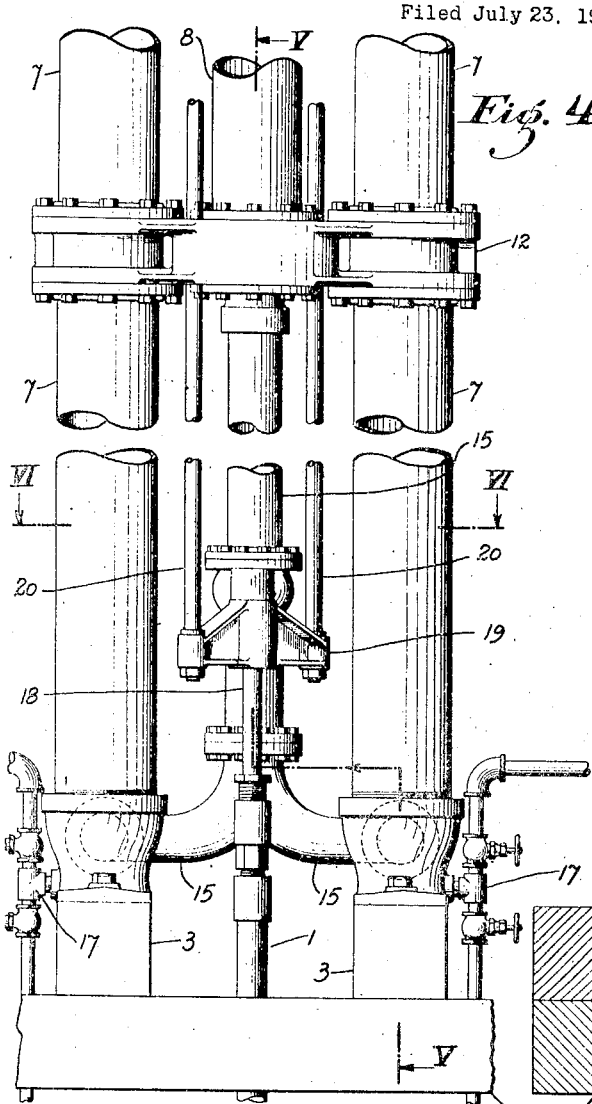
Fig. 4 is an enlarged broken view of the lower half of Fig. 1.
Figure 5:
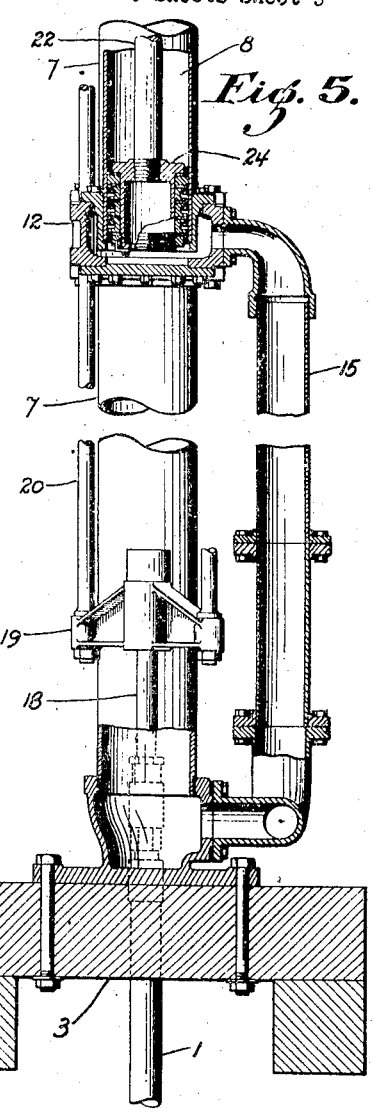
Fig. 5 is a side elevation thereof mostly in section on line V—V, Fig. 4.
Figure 6:
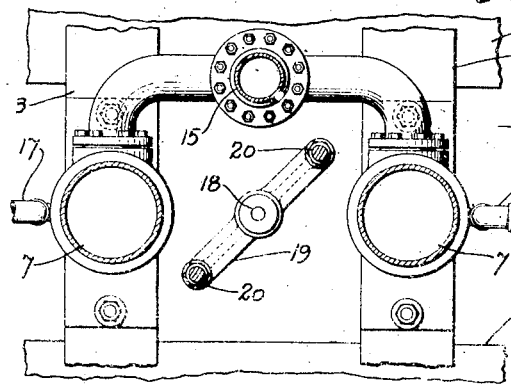
Fig. 6 is a plan section on line VI—VI, Fig. 4.
Figure 15:
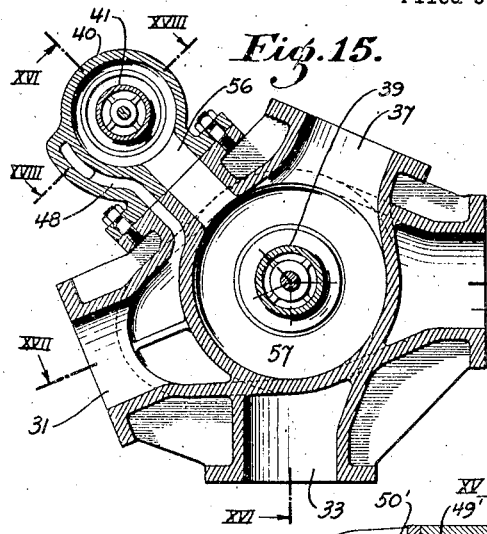
Fig. 15 is a sectional view therethrough.
Figure 14:
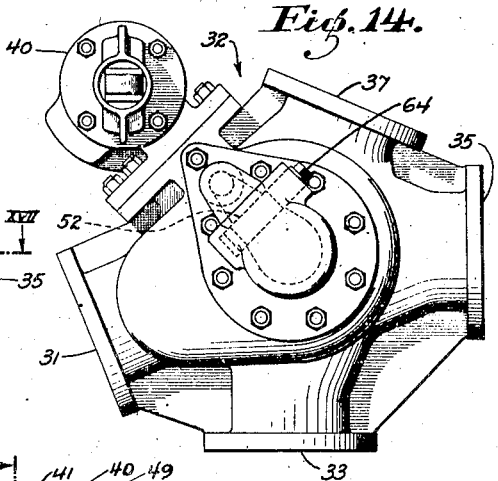
Fig. 14 is a side elevation of the valve mechanism at the top of Fig. 2.

Referring more specifically to the drawings, 1 indicates the tube of an oil well over which is mounted my improved pumping mechanism 2. The mechanism 2 is mounted on supporting blocks 3 supported on a base 4. A derrick 5 on the base 4 provides an upper supporting platform 6.

The mechanism 2 comprises a pair of cylindrical uprights 7 each having a continuous opening therethrough closed only at the top and bottom. The cylinders serve as fluid pressure tanks cooperating with the counterbalancing cylinder 8 located between the two cylinders 7 and beneath a power cylinder 9, the lower cylinder 9 counterbalancing cylinder 8 and tube 1 being axially aligned. Each of cylinders 7 is formed of four joints connected together at 10, 11, and 12. The cylinders 7 are in communication with each other by a port 13 through a closure cap 14 on the tops thereof. A pipe 15 provides communication between the lower end of the cylinder 8 and the lower ends of the cylinders 7. Connections 17 are provided with the bottoms of the cylinders 7 whereby these cylinders can be drained or filled with fluid under pressure.

The pump rods 18 are directly connected to a cross head 19 connected by a pair of upwardly extending rods 20 to a cross head 21. The cross head 21 is between the cylinders 8 and 9 and is mounted on the adjacent co-axial ends of the piston rods 22 and 23 extending into the cylinders 8 and 9 respectively. A single acting counterbalancing piston 24 is mounted on the rod 22 within the cylinder 8. A double acting power piston 25 is mounted on the rod 23 within the cylinder 9. The reciprocation of the parts is steadied by a stationary rod 21' extending through the cross head 21.

The upper end of the hub of the cross head 21 is cupped at 21² and a downwardly extending hole 21³ is provided therethrough. The rod 22 extends upwardly through a cupped guiding box 22' having openings through the bottom thereof. The arrangement is such that leakage from the rod 23 is collected in the cup 21² and drains downwardly through the hole 21³ into the cup 22'. Leakage from the rod 22 also drains into the cup 22'. The drainage runs from the cup 22' into the cylinder 8 from which it is forced into a collecting chamber 8' by the piston 24. The chamber 8' can be drained by a pipe 11'. A simple means is thereby provided for collecting all drainage from both rods 22 and 23.

The power unit furnishing fluid pressure to the power cylinder 9 may be mounted on the base 4 or platform 6. As illustrated the same is mounted on the platform 6. This unit may be any kind of pump, such as rotary, reciprocating, turbine, centrifugal, etc. As illustrated the same comprises a rotary pump 26 directly driven by a motor 27. The intake pipe 28 to the pump is in communication with the bottom of a surge or receiving tank 29. The outlet pipe 30 from the pump is in communication with a port 31 in a four-way valve 32, an air chamber 30' being provided therein. The port 33 is connected by a pipe 34 to the lower end of the power cylinder 9. The port 35 is connected by a duct 36 to the upper end of such cylinder. The exhaust port 37 is connected by a pipe 38 to the top of the tank 29. A governor valve 16, like the valves shown in my said co-pending application, is provided in this pipe to regulate the flow of fluid from the cylinder 9 to the tank 29.

Figure 16:
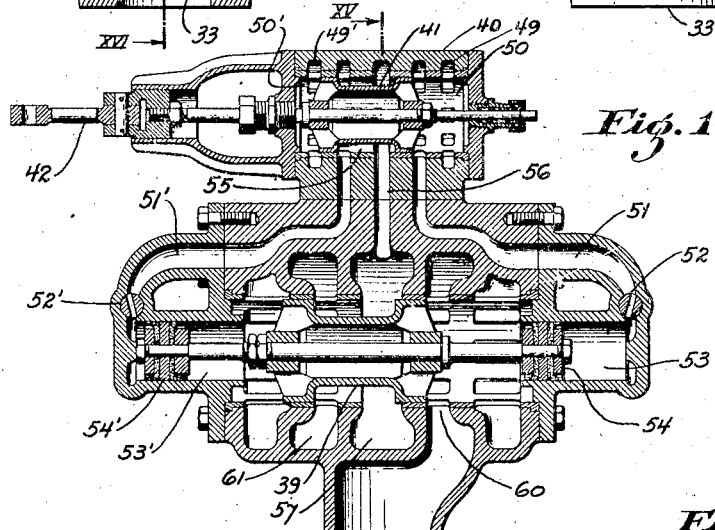
Fig. 16 is a sectional view taken on line XVI—XVI, Fig. 15.
Figure 18:
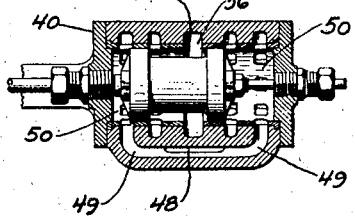
Fig. 18 is a sectional view taken on line XVIII—XVIII Fig. 15.

The position of the sliding valve member 39 of the valve 32 is controlled by fluid pressure through an auxiliary controlling valve 40 having a sliding cut-off element 41 therein. This controlling element 41 is automatically moved to two positions by the following mechanism, one of such positions being indicated in Figs. 16 and 18. A link 42 connects the element to the free end of an arm 43 mounted on the upper end of a vertical shaft 44. This shaft carries two arms 45 and 46 having rollers 45' and 46' thereon adapted to be engaged by a cam plate 47 on the cross-head 21. Upon downward movement of the cross-head, the cam engages the roller 46' and rotates the rod in a direction to move the element 41 to the position indicated in Fig. 16. Upon upward movement of the cross-head, the cam plate engages the roller 45' and rotates the rod to move the element in the opposite direction.

The port 31 from the pump is connected by a duct 48 and branch ducts 49 and 49' to the opposite ends 50 and 50' of the auxiliary valve 40. When the element 41 is in the left hand position shown in Fig. 16, the fluid under pressure flows from the chamber 50 through duct 51 and cracking valve 52 to a cylinder 53 and operates on a piston 54 to move the valve member 39 to the left hand position illustrated. When the element 41 is moved to the right hand position, the fluid flows from the chamber 50' through duct 51' and cracking valve 52' to a cylinder 53' and operates on a piston 54' to move the valve member 39 to the right hand position. The cylinders 53 and 53' exhaust through ports 55 and 56, exhaust chamber 57, and exhaust port 37.

Figure 17:
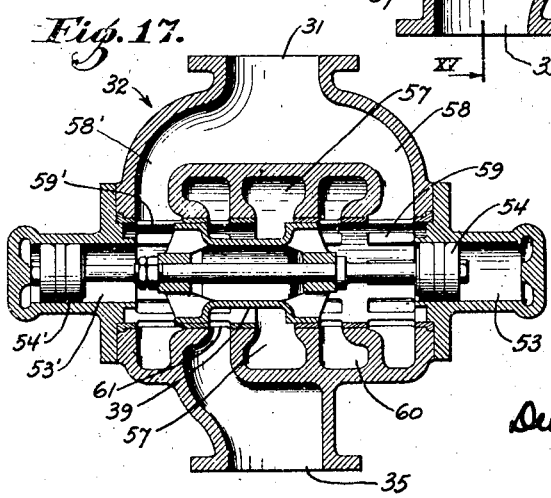
Fig. 17 is a sectional view taken on line XVII—XVII Fig. 15.

As illustrated in the drawings, the reciprocating mechanism including the piston 25 has just completed the downward stroke, the cam 47 has moved the element 41 to the left hand position illustrated, and the fluid pressure through the duct 51 has moved the valve member 39 to the left. As illustrated in Fig. 17, the intake port 31 branches at 58 and 58' and is opened at all times to the opposite ends of valve 32 through slotted cages 59 and 59'. With the parts in the position illustrated, the fluid flows through the cage 59, port 60, port 33, and pipe 34 to the bottom of the cylinder 9, thus forcing the piston 25 and its connected parts upwardly. During this time, the fluid in the upper end of the cylinder 9 is escaping through opening 36, port 34, port 61, exhaust chamber 57, exhaust port 37, and pipe 38 to the bank 29. The valve 16 regulates the rate of reciprocation and, in case of rod breakage, this valve would prevent the destructive upward movement of the reciprocating parts.

It should be noted that a cylindrical member 62 is mounted on both ends of the piston 25. Each end of the cylinder 9 is provided with a plurality of triangular slots 63 through which the fluid flows to and from the cylinder. The arrangement is such that when the piston approaches either end of the cylinder, the member 62 progressively covers the openings 63 to limit the escape of the fluid therefrom, whereby cushioning the ends of the piston stroke. When the member 62 has completely covered the slots 63, the fluid can escape to the outlet pipe 34 or opening 36 only through a cracking valve 64, thereby still more cushioning the extreme end of the stroke. A safety relief valve 65 is also provided in each end of the cylinder 9 for permitting escape of the fluid in cases of emergency. A pipe 66 connects the outlets of the valves 65 with the tank 29. It will be clear from the drawings that the lower and upper ends of cylinder 9 each terminates in chambers 34ᵃ and 36ᵃ. When the slots 63 are covered, the only outlet from these chambers is through the cracking valve 64 to the chambers 34ᵇ and 36ᵇ, and through the relief valve 65.

The operation of my improved system is substantially as follows: In a 5,000 foot oil well the pump or sucker rods weigh about 8450 pounds and the oil load lifted thereby at each upward stroke is about 9500 pounds. It will now be assumed that the mechanism is to be used in pumping such a well. Fluid under pressure is supplied to the cylinders 7 sufficient to raise the piston 24 with a force equal to the weight of the rods plus one-half of the weight of the oil load. Thus, this pressure should exert an upward force of 8450 pounds plus 4750 pounds, or 13,200 pounds on the piston 24. Assuming that the motor 27 and pump 26 are operating and that the parts are in the positions illustrated, fluid flows from the pump 26 through pipe 30, port 31, cage 59, ports 60 and 33, and pipe 34 to the bottom of the cylinder 9 and raises the piston 25 and pump rods and said load upwardly. Obviously the load lifted is one-half the oil load, or 4750 pounds.

Near the upper end of the stroke the cam 47 engages the roller 45' and through the shaft 44 moves the element 41 to the right hand position. The fluid thereupon flows through ports 48 and 48', chamber 50', duct 51', cracking valve 52', to cylinder 53', and operates on piston 54' to move the valve member 39 to the right hand position. The fluid thereupon flows from pump 26 through pipe 30, ports 31 and 58', cage 59', ports 61, 35, and 36, to the top of cylinder 9, thus forcing the piston 25 and pump rods downwardly. The pressure exerted thereon is the amount which the rods are over-counterbalanced; namely, 4750 pounds, or one-half the oil load. It will therefore be seen that pump 26 operates continuously and that the force exerted thereby through the pipe 30 and valve 32 is substantially constant, being the same on both the up and down strokes of the pumping mechanism.

It is believed that the many advantages of my improved system will be obvious without further description herein.

Having thus described my invention, what I claim and desire to secure by Letters Patent is—

1. A pumping mechanism comprising the combination of a cylinder, a piston operating therein, a long pump rod connected to the piston, means co-operating with the piston and pump rod to overcounterbalance and normally move the same upwardly with considerable surplus lifting force, a continuously operating pump, pipes connecting the pump with the cylinder at opposite sides of the piston, a valve, and means automatically operating the valve in timed relation to the piston movement to alternately place the pump in communication with the cylinder at the opposite sides of the piston through the said pipes.

2. A pumping mechanism, comprising the combination of a cylinder, a piston operating therein, a second cylinder having a piston operating therein and connected to the first piston, means providing fluid pressure normally operating on the second piston to lift the same upwardly, a source of fluid pressure supply, pipes connecting the same with the first cylinder at opposite sides of the piston therein, a valve, and means automatically operating the valve in timed relation to the piston movement to alternately place the pump in communication with the first cylinder at opposite sides of the piston through the said pipes.

3. A pumping mechanism comprising the combination of a cylinder, a piston operating therein, a second cylinder co-axial with the first cylinder and having a piston operating therein and connected to the first piston, means providing fluid pressure normally operating on the second piston to lift the same upwardly, a source of fluid pressure supply, pipes connecting the same with the first cylinder at opposite sides of the piston therein, a valve, and means automatically operating the valve in timed relation to the piston movement to alternately place the pump in communication with the first cylinder at opposite sides of the piston through the said pipes.

4. A pumping mechanism comprising the combination of a cylinder, a piston operating therein, counterbalancing means cooperating with the piston to normally move the piston upwardly, a source of fluid pressure supply, pipes connecting the same with the cylinder at opposite sides of the piston therein, a valve, means automatically operating the valve in timed relation to the piston movement to alternately place the pump in communication with the cylinder at opposite sides of the piston through the said pipes, and means at both ends of the cylinder for controlling the flow of fluid therefrom in a manner cushioning the ends of the stroke.

WILLIAM E. HUBBARD.